United States Patent
Kashima et al.

(10) Patent No.: US 7,199,980 B2
(45) Date of Patent: Apr. 3, 2007

(54) PLATE WELDING STRUCTURE AND HEAD SUSPENSION

(75) Inventors: Hideki Kashima, Yokohama (JP); Itsuo Yasuda, Yokohama (JP); Masato Kitakata, Yokohama (JP); Yoichi Ikeji, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 10/925,251

(22) Filed: Aug. 24, 2004

(65) Prior Publication Data

US 2005/0045601 A1   Mar. 3, 2005

(30) Foreign Application Priority Data

Aug. 25, 2003   (JP)   ............... 2003-299537

(51) Int. Cl.
  G11B 5/48    (2006.01)
  B23K 26/20   (2006.01)
(52) U.S. Cl. ............... 360/244.9; 219/121.64; 428/594; 428/600
(58) Field of Classification Search ........... 219/121.63, 219/121.64, 121.74; 428/594, 600; 360/244.2, 360/244.3, 244.9, 245, 245.2, 245.4; 403/270
See application file for complete search history.

(56) References Cited

U.S. PATENT DOCUMENTS

| | | | |
|---|---|---|---|
| 5,201,458 A | * | 4/1993 | Hagen ............... 219/121.64 |
| 6,417,995 B1 | * | 7/2002 | Wu et al. ............... 360/245 |
| 6,697,227 B2 | | 2/2004 | Kashima et al. |
| 6,900,966 B1 | * | 5/2005 | Xu ............... 360/244.9 |
| 2002/0080527 A1 | * | 6/2002 | Shiraishi ............... 360/244.3 |
| 2002/0181155 A1 | * | 12/2002 | Takagi et al. ............... 360/244.3 |

FOREIGN PATENT DOCUMENTS

| JP | 63-130290 A | * | 6/1988 | ............... 219/121.64 |
|---|---|---|---|---|
| JP | 2002-133809 | | 5/2002 | |

* cited by examiner

Primary Examiner—Geoffrey S. Evans
(74) Attorney, Agent, or Firm—Jordan and Hamburg LLP

(57) ABSTRACT

A head suspension provided with a plate welding structure relaxes a laser beam positioning accuracy, improves a mass production ability, suppresses the generation of spattered matter, and prevents the deformation of plates during welding.

The head suspension (1) has a base plate (3) to be attached to a carriage and a load beam (5) having a rigid part (9) and a resilient part (11). The load beam is supported by the base plate and applies load on a slider that is arranged at a front end of the load beam. A reinforcing plate (25) is laid over the base plate, and a laser beam is emitted to a weld spot to weld the reinforcing plate and base plate together. The reinforcing plate is provided with thin parts (29) each containing the weld spot. Each thin part is irradiated with a laser beam to weld the base plate and reinforcing plate together.

9 Claims, 5 Drawing Sheets

2

PLATE WELDING STRUCTURE AND HEAD SUSPENSION

BACKGROUND OF THE INVENTION

1. Field of the Invention

The present invention relates to a plate welding structure for overlapped plates to be welded by, for example, laser and to a head suspension incorporated in, for example, a hard disk drive of an information processing device such as a personal computer.

2. Description of Related Art

An example of a plate welding structure is disclosed in Japanese Unexamined Patent Application Publication No. 2002-133809. FIGS. 13 to 15 explain such a conventional plate welding structure, in which FIG. 13 is a partly broken side view showing part of a head suspension 101 before welding, FIG. 14 is an enlarged sectional view showing essential part of FIG. 13, and FIG. 15 is an enlarged sectional view showing the same part after welding.

The head suspension 101 has a load beam 103 and a base plate 105.

The load beam 103 includes a rigid part 107 and a resilient part 109 and serves to apply load on a head slider (not shown) that is arranged at a front end of the load beam 103. The resilient part 109 is made of a resilient plate 111. The resilient plate 111 has a base that is held between the base plate 105 and a reinforcing plate 113 and is laser-welded and fixed between them. The laser welding is carried out by forming small holes 115 in, for example, the reinforcing plate 113 as shown in FIGS. 13 and 14. A laser beam is aimed at each small hole 115 and forms a weld part W shown in FIG. 15.

The base plate 105 is provided with a boss 117 to be fitted to an arm of a carriage.

The small holes 115 formed in the reinforcing plate 113 allow the overlapped base plate 105, resilient plate 111, and reinforcing plate 113 to be welded together with a laser beam of reduced energy. Reducing the energy of a laser beam is effective to suppress the generation of spattered matter.

Emitting a laser beam to the small hole 115, however, needs the precision positioning of the reinforcing plate 113 and laser beam. This puts a limit on mass production.

To solve the problem, the small holes 115 may be enlarged so that a laser beam is easily aimed at each small hole. However, excessively enlarging the small holes 115 results in making each small hole disproportionate to the weld part W as shown in FIG. 16. In this case, even if the strength of the weld part W is sufficient, a gap 119 may be formed between the weld part W and the hole 115 to make it difficult to distinguish a defective weld from an acceptable weld by eye.

In addition, the presence of the gap 119 may catch air that is hardly removable even with an inert gas such as a nitrogen gas blown thereto at the time of laser welding. Then, the air with a laser reaction will change color around the gap 119.

If no small holes 115 are formed for laser welding, a laser beam of increased energy must be employed. This results in generating spattered matter and deforming the reinforcing plate 113 and the like during the welding.

SUMMARY OF THE INVENTION

An object of the present invention is to provide a plate welding structure and a head suspension, capable of relaxing a laser beam positioning accuracy, improving a mass production ability, suppressing the generation of spattered matter, and preventing the deformation of plates during welding.

In order to accomplish the object, a first aspect of the present invention provides a plate welding structure or a head suspension having a thin part formed on a given one of plates, the thin part containing a weld part and being irradiated with a laser beam to weld the plates together.

The first aspect forms a thin part on a given one of plates and emits a laser beam to the thin part to weld the plates together. This configuration allows the energy of the laser beam to be reduced and prevents the generation of spattered matter by the laser welding and the deformation of the plates.

The thin part may relatively be larger than the weld part. Even in this case, no gap to catch air will be formed between the thin part and the weld part. This prevents color change due to the welding.

The thin part can be made greater than the weld part. This realizes an easy positioning of a laser beam with respect to the thin part. This is advantageous for mass production.

A second aspect of the present invention forms the thin part from a recess formed in a face of the given plate. The recess has an opening at an edge of the plate so that the recess is opened to the outside of the face of the plate.

According to the second aspect, an inert gas such as a nitrogen gas blown to the thin part at the time of laser welding flows along the recess and goes outside the plate face from the opening at the edge. This prevents air from staying in the thin part and surely prevents the color change of a product due to the laser welding.

A third aspect of the present invention forms the thin part from a recess formed in a face of the given plate, the recess being opened to the outside of the plate face with a through hole formed through the plates at a location other than the weld part.

According to the third aspect, an inert gas such as a nitrogen gas blown to the thin part at the time of laser welding is discharged outside the plate face through the through hole formed through the plates. This results in preventing air from staying at the thin part and surely prevents the color change of a product due to the laser welding.

A fourth aspect of the present invention forms the thin part from a recess formed in a face of the given plate, the recess being larger than the weld part so that it is opened to the outside of the plate face around the weld part.

According to the fourth aspect, an inert gas such as a nitrogen gas blown to the thin part at the time of laser welding is discharged to the outside of the plate face from around the weld part. This results in preventing air from staying at the thin part and surely preventing the color change of a product due to the laser welding.

A fifth aspect of the present invention forms the thin part by partial etching or pressing.

According to the fifth aspect, the thin part is easily formed.

A sixth aspect of the present invention separately forms the rigid part and resilient part of the load beam, joins the rigid part to a first side of the resilient part, and overlays and joins a second side of the resilient part onto a reinforcing plate.

According to the sixth aspect, the material and thickness of the rigid part of the load beam are not restricted by those of the resilient part. This enables the materials and thicknesses of the rigid part and resilient part to be independently selected according to their respective requirements, thereby correctly satisfying performance required for the head suspension.

For example, the rigid part of the load beam may be made of a thick plate to eliminate a bending process of forming bent edges or ribs on the rigid part. In addition, the thick plate improves the rigidity of the rigid part and reduces the air resistance thereof. This results in reducing turbulence when disks are rotated at high speed in a hard disk drive in which the head suspension is installed and preventing the head suspension from fluttering.

DETAILED DESCRIPTION OF EMBODIMENTS

Figure 1:
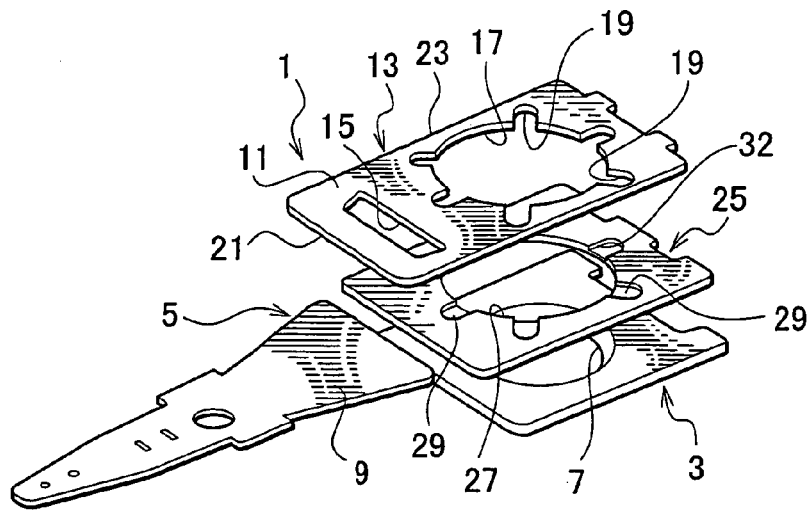
FIG. 1 is an exploded perspective view partly showing a head suspension without a flexure, according to a first embodiment of the present invention.

FIG. 1 is an exploded perspective view partly showing a head suspension without a flexure, according to the first embodiment of the present invention. The head suspension 1 has a base plate 3 and a load beam 5.

The base plate 3 is attached to an arm of a carriage. The base plate 3 is made from, for example, a stainless steel plate by pressing. According to the embodiment, the base plate 3 has a thickness of 0.2 mm. The base plate 3 has an integrated boss 7 protruding from a side face (bottom face in FIG. 1) of the base plate 3. The boss 7 is fitted to a fitting hole of the carriage arm and is fixed thereto by caulking, i.e., by passing a hard ball therethrough.

The load beam 5 includes a rigid part 9 and a resilient part 11.

The rigid part 9 is made of, for example, stainless steel and has a thickness of about 0.1 mm according to the embodiment. The rigid part 9 may be made of an alloy containing light metal (metal lighter than Fe) such as aluminum (Al) and titanium (Ti), or synthetic resin, to reduce the weight of the head suspension 1 and improve the rigidity thereof.

The rigid part 9 may be made of a composite material (clad material) consisting of layers of two or more materials including light metal such as aluminum and titanium, or an alloy mainly containing such light metal and other metal such as stainless steel.

The resilient part 11 is made of a resilient plate 13 that is independent of the rigid part 9. Due to this structure, proper materials and thicknesses can be selected for the rigid part 9 and resilient part 11, respectively, to easily satisfy characteristics such as high rigidity required for the rigid part 9 and characteristics such as a low spring constant required for the resilient part 11. For example, the resilient part 11 is made of a precision rolled material to provide a stable low spring constant.

The resilient plate 13 is made of, for example, a thin resilient stainless steel plate and has a thickness of, for example, 0.04 mm. The resilient plate 13 has an opening 15 and a through hole 17 formed by, for example, etching or precision pressing.

The opening 15 of the resilient plate 13 partially realizes a low bending rigidity (spring constant) and forms a spring 11 between the base plate 3 and the rigid part 9. One side of the spring 11, i.e., a front end 21 of the resilient plate 13 is laid on a base end of the rigid part 9 and is fixed thereto by welding such as laser welding or by bonding. The other side of the spring 11, i.e., a base end 23 of the resilient plate 13 is laid over a reinforcing plate 25 and is fixed thereto by welding such as laser welding or by bonding.

The through hole 17 is used to pass a ball for caulking. Through recesses 19 are formed at regular intervals along the periphery of the through hole 17.

The reinforcing plate 25 forms a main plate of the load beam 5 together with the rigid part 9. The reinforcing plate 25 and rigid part 9 are formed by, for example, pressing. According to the embodiment, the reinforcing plate 25 and rigid part 9 are made of the same material and have an identical thickness.

The reinforcing plate 25 has a through hole 27 whose diameter is substantially equal to that of the through hole 17 of the resilient plate 13. The diameters of the through holes 17 and 27 are set to be greater than an inner diameter of the boss 7.

Around the through hole 27, there are formed thin parts 29 at regular intervals. The thin parts 29 positionally correspond to the through recesses 19 of the resilient plate 13 and have substantially the same shape and size as those of the through recesses 19.

The reinforcing plate 25 is laid over the base plate 3. A weld spot contained in each thin part 29 is irradiated with a laser beam to weld the base plate 3 and reinforcing plate 25 together.

A flexure (not shown) is attached to the rigid part 9 by welding such as laser welding or by bonding. The flexure consists of a metal base made of, for example, a resilient thin stainless rolled plate, an electric insulating layer formed on a surface of the metal base, and a conduction path formed on the insulating layer. An end of the conduction path is connected to a terminal arranged at a head, and the other end thereof is connected to a terminal for reading out signals. The flexure has a tongue to which a head slider is attached.

Figure 2:
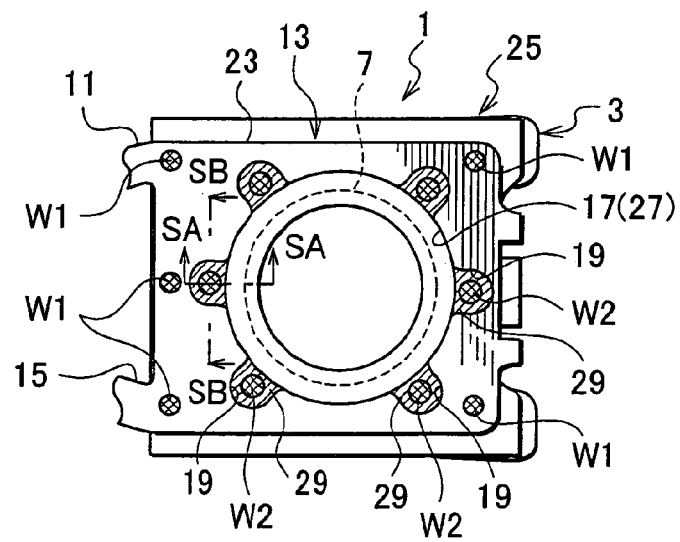
FIG. 2 is a plan view showing weld locations of the head suspension according to the first embodiment.
Figure 3:
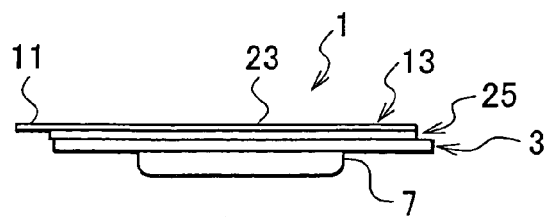
FIG. 3 is a side view showing part of the head suspension according to the first embodiment.

FIG. 2 is a plan view showing weld spots to weld the base plate 3, reinforcing plate 25, and resilient plate 13 together. Hatched parts in FIG. 2 represent the thin parts 29. FIG. 3 is a side view of FIG. 2.

In FIGS. 2 and 3, the head suspension 1 includes the base plate 3, reinforcing plate 25, and resilient plate 13 laid one upon another in this order. The resilient plate 13 and reinforcing plate 25 are welded together at locations other than the thin parts 29. According to this embodiment, they are laser-welded together at three weld spots W1 along the opening 15 and at two weld spots W1 along an edge 2 on the other side of the through hole 17.

The base plate 3 and reinforcing plate 25 are laser-welded together at weld spots W2 in the thin parts 29.

Figure 4:
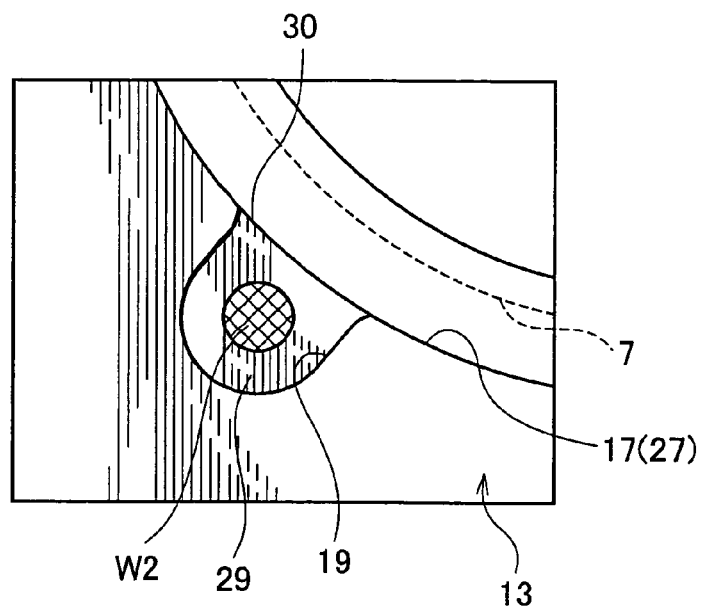
FIG. 4 is an enlarged plan view showing one of the weld locations according to the first embodiment.
Figure 5:
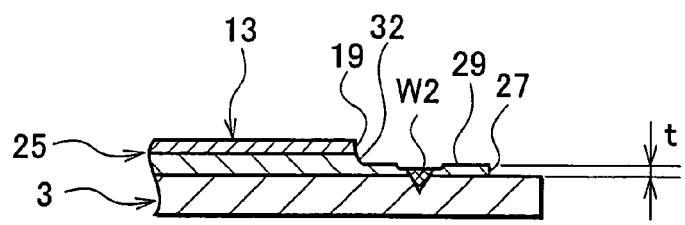
FIG. 5 is a sectional view taken along a line SA—SA of FIG. 2.
Figure 6:
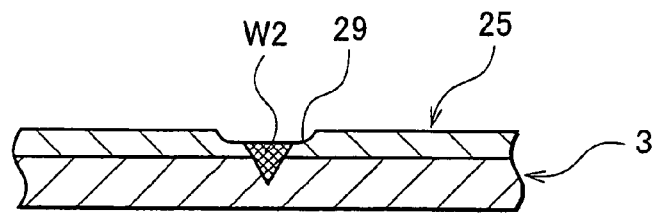
FIG. 6 is an enlarged sectional view taken along a line SB—SB of FIG. 2 without a resilient plate.
Figure 7:
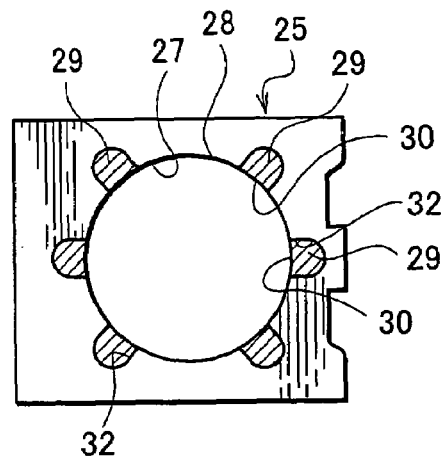
FIG. 7 is a plan view showing a reinforcing plate according to the first embodiment.

FIG. 4 is an enlarged plan view showing an area around the weld spot W2, FIG. 5 is a sectional view taken along a line SA—SA of FIG. 2, FIG. 6 is an enlarged sectional view taken along a line SB—SB of FIG. 2 without the resilient plate, and FIG. 7 is a plan view showing the reinforcing plate 25. Hatched parts of FIG. 7 represent the thin parts 29.

In FIGS. 4 to 7, the thin parts 29 according to this embodiment are formed by partial etching. In FIG. 5, the thickness of each thin part 29 is t=0.03 to 0.075 mm with respect to a thickness of 0.1 mm of the reinforcing plate 25. Each thin part 29 has the same peripheral shape as the through recess 19 of the resilient plate 13. The peripheral shape of the thin part 29 may slightly be larger than that of the through recess 19 of the resilient plate 13, to absorb a slight positioning error.

The thin part 29 is defined by a recess 32 formed in a face of the reinforcing plate 25. The recess 32 is extended along the face of the reinforcing plate 25 in the radial direction of the through hole 27. The recess 32 has an opening 30 that is open to an edge 28 of the through hole 27, i.e., an edge of the reinforcing plate 25. With the extended shape and the opening 30, the recess 32 is open to the outside of the face of the reinforcing plate 25. Namely, each recess 32 is open to the inside of the through hole 27.

When laser welding is conducted by blowing an inert gas such as a nitrogen gas to the thin part 29 and by emitting a laser beam thereto, the inert gas flows from the recess 32 to the edge 28 of the through hole 27 and is smoothly discharged from the opening 30 of the edge 28 to the outside through the through hole 27. Discharging the inert gas results in preventing air from staying in the recess 32. Namely, when forming the weld spot W2 in the thin part 29 by emitting a laser beam thereto, a laser reaction will cause no color change at and around the thin part 29.

As a result, blowing an inert gas to each thin part 29 and emitting a laser beam to a weld spot in the thin part 29 surely weld the base plate 3 and reinforcing plate 25 together at the weld spots W2.

The laser welding in the thin part 29 is achievable with a laser beam of reduced energy. This prevents the generation of spattered matter and the deformation of the reinforcing plate 25 and base plate 3 during the welding.

Enlarging the thin part 29 larger than the weld spot W2 results in relaxing the positioning accuracy of a laser beam. This is appropriate for mass production.

Even if the thin part 29 is made larger than the weld spot W2, the embodiment forms no air-catching gap around the weld spot W2.

The recess 32 is useful to form the thin part 29 without introducing gaps to catch air.

This embodiment also prevents making it difficult to distinguish a defective weld from an acceptable weld by eye.

Figure 8:
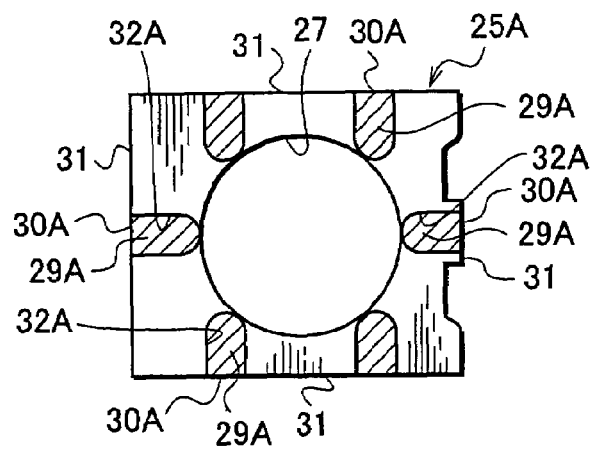
FIG. 8 is a plan view showing a reinforcing plate according to a modification of the first embodiment.
Figure 9:
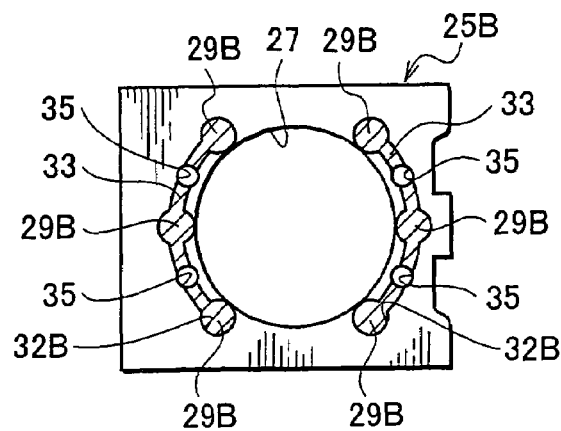
FIG. 9 is a plan view showing a reinforcing plate according to another modification of the first embodiment.

FIGS. 8 and 9 are plan views showing thin parts formed on reinforcing plates according to modifications of the first embodiment of the present invention. In FIG. 8, the reinforcing plate 25A has the thin parts 29A each made by a recess 32A. The recesses 32A are formed around a through hole 27. Each recess 32A is extended along a face of the reinforcing plate 25A and has an opening 30A that is open to an outer edge 31 of the reinforcing plate 25A. With the extended shape and opening 30A, the recess 32A is open to the outside of the face of the reinforcing plate 25A.

According to the modification of FIG. 8, an inert gas is blown to the thin part 29A during laser welding. The inert gas is guided along the recess 32A to the outer edge 31 and is discharged through the opening 30A at the outer edge 31 to the outside of the face of the reinforcing plate 25A. This prevents the thin part 29A from catching air and from changing its color due to the laser welding.

According to the modification of FIG. 9, the reinforcing plate 25B has the thin parts 29B made by a recess 32B. More precisely, each recess 32B includes, along a through hole 27, three thin parts 29B and thin connections 33 to connect the thin parts 29B to each other. In the middle of each connection 33, there is a hole 35. The hole 35 communicates with a through hole formed in a base plate 3. Namely, the hole 35 is formed outside a weld spot and passes through the base plate 3 and reinforcing plate 25B. With the holes 35 and connections 33, each of the thin parts 29B is open to the outside of the reinforcing plate 25B.

To conduct laser welding, an inert gas is blown to the thin part 29B. The inert gas is guided through the connections 33 and holes 35 to the base plate 3 side and is discharged outside from the holes in the base plate 3. At this time, a jig on the base plate 3 side must be arranged to avoid the holes 35.

Discharging the inert gas in this way prevents the thin parts 29B from catching air and from changing their colors due to the laser welding.

The thin parts 29, 29A, or 29B may be formed on the base plate 3. In this case, the thin parts may be formed by, for example, pressing.

Figure 10:
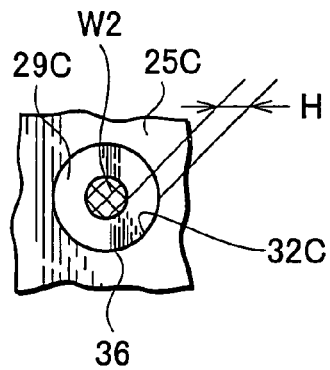
FIG. 10 is a plan view partly showing still another modification of the first embodiment.

FIG. 10 is a plan view partly showing another modification of the first embodiment of the present invention. This modification forms a thin part 29C having a circular shape in a plan view. A weld spot W2 is set at a central part of the thin part 29C. It is preferable to set a distance H between a peripheral edge 36 of a recess 32C and the weld spot W2 to be about 0.5 mm or larger. This configuration smoothly discharges an inert gas used for laser welding from the thin part 29C, to surely prevent the thin part 29C from catching air and changing its color.

Figure 11:
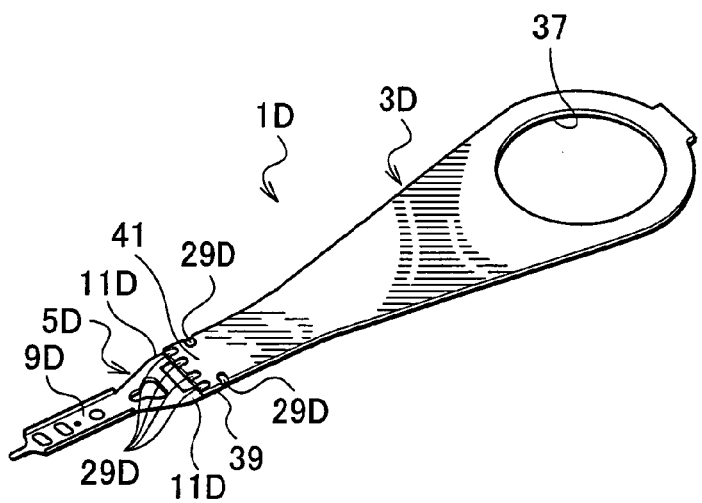
FIG. 11 is a perspective view showing a head suspension without a flexure according to a second embodiment of the present invention.
Figure 12:
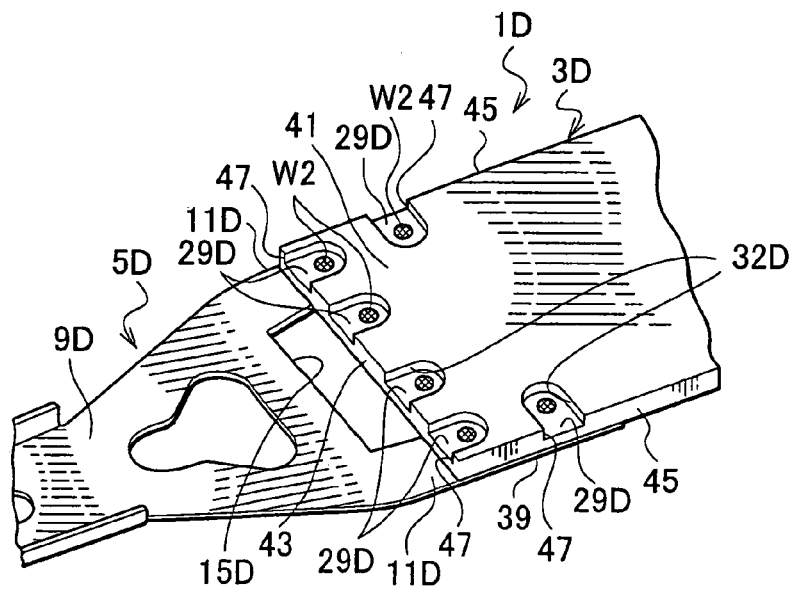
FIG. 12 is a perspective view partly showing the head suspension of FIG. 11.
Figure 13:
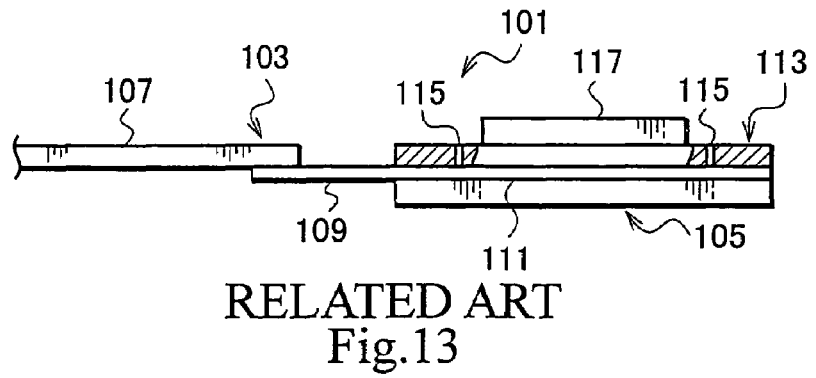
FIG. 13 is a partly broken side view showing a head suspension before welding according to a related art.
Figure 14:
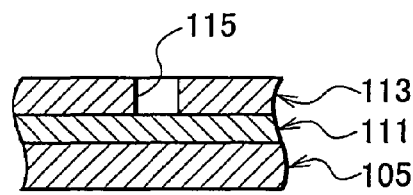
FIG. 14 is an enlarged sectional view showing a part of the related art before welding.
Figure 15:
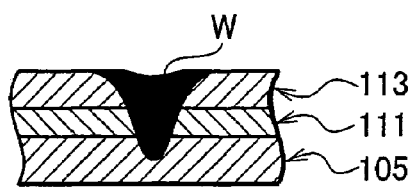
FIG. 15 is an enlarged sectional view showing the same part after welding.
Figure 16:
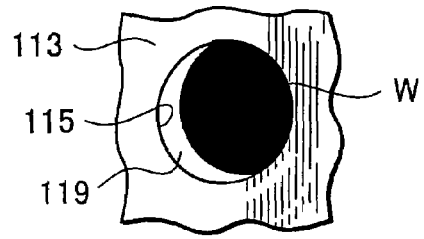
FIG. 16 is an enlarged plan view showing a welded state of an enlarged hole according to a related art.

FIGS. 11 and 12 show a head suspension according to the second embodiment of the present invention, in which FIG. 11 is a perspective view showing the head suspension without a flexure and FIG. 12 is a perspective view showing part of the head suspension.

In FIG. 11, the head suspension 1D has a base plate 3D and a load beam 5D. A flexure (not shown) is attached to the head suspension 1D by, for example, welding such as laser welding or by bonding.

The base plate 3D is extended to serve as an arm of a carriage and has a hole 37 to be fitted and fixed to a spindle of the carriage.

The load beam 5D includes a rigid part 9D and a resilient part 11D that are integral with each other. The resilient part 11D has an opening 15D formed at a base end of the rigid part 9D.

A base end 39 of the load beam 5D is laid on a front end 41 of the base plate 3D, and they are fixed to each other by laser welding.

More precisely, the front end 41 of the base plate 3D is provided with a plurality of thin parts 29D as shown in FIGS. 11 and 12. Each thin part 29D includes a recess 32D made in the base plate 3D. The recess 32D is extended along a face of the base plate 3D up to an outer edge 43 or 45 and has an opening 47 that is open at the outer edge 43 or 45. Due to the extended shape and opening 47, the recess 32D is open to the outside of the face of the base plate 3D.

A weld spot W2 in each thin part 29D is irradiated with a laser beam to be formed, to weld the base plate 3D and load beam 5D together.

When conducting laser welding, an inert gas is blown to the thin part 29D. The inert gas is guided along the recess 32D of the thin part 29D to the outer edge 43 or 45 and is discharged to the outside of the base plate 3D through the opening 47. This prevents the thin part 29D from catching air and from changing its color during the laser welding.

Although the embodiments mentioned above apply the welding structure of the present invention to the base plate and reinforcing plate of a head suspension, or to the base plate and load beam of a head suspension, the welding structure of the present invention is also applicable to any other plate materials to be welded together.

What is claimed is:

1. A welded plate structure welded by a laser, comprising:
    plates including a first plate having a first surface and an opposing second surface, and a second plate disposed adjacent the second surface of the first plate;
    the first plate being formed of a plate material and defining a recess in the first surface having a recess bottom and a recess side surface bordering the recess bottom, the bottom surface and the recess side surface being formed of the plate material of the first plate;
    the first plate having a thin part defined by the recess bottom and the second surface of the first plate and having a weld spot formed by a laser beam welding the first and second plates together;
    the second plate and having a through hole; and
    the recess bottom having a through hole at a position other than the weld spot and aligned with the through hole of the second plate to provide a through opening extending through the recess bottom and the second plate to communicate a volume of the recess to outside of the second plate.

2. The welded plate structure of claim 1, wherein the thin part is formed by partial etching or pressing.

3. A head suspension provided with the welded plate structure of claim 2, wherein:
    the plates include a base plate to be fitted to a carriage and a load beam having a rigid part and a resilient part, the load beam being supported by the base plate and applying load on a slider arranged at a front end of the load beam; and
    the base plate is the second plate, and said load beam includes the first plate.

4. The head suspension of claim 3, wherein:
    the load beam includes a reinforcing plate to be welded to the base plate; and
    the reinforcing plate is the first plate.

5. The head suspension of claim 4, wherein:
    the rigid part and resilient part of the load beam are separately formed;
    the rigid part is joined to a first side of the resilient part; and
    a second side of the resilient part is laid on and joined to the reinforcing plate.

6. A head suspension provided with the welded plate structure of claim 1, wherein:
    the plates include a base plate to be fitted to a carriage and a load beam having a rigid part and a resilient part, the load beam being supported by the base plate and applying load on a slider arranged at a front end of the load beam; and
    the base plate is the second plate, and said load beam includes the first plate.

7. The head suspension of claim 6, wherein:
    the load beam includes a reinforcing plate to be welded to the base plate; and
    the reinforcing plate is the first plate.

8. The head suspension of claim 7, wherein:
    the rigid part and resilient part of the load beam are separately formed;
    the rigid part is joined to a first side of the resilient part; and
    a second side of the resilient part is laid on and joined to the reinforcing plate.

9. A head suspension comprising:
    a base plate to be fitted to a carriage;
    a load beam having a rigid part and a resilient part, the load beam being supported by the base plate and applying load on a slider arranged at a front end of the load beam;
    the resilient part being formed of a resilient plate formed of a plate material separate from and connected to the rigid part;
    the load beam including a reinforcing plate formed of plate material thicker than the resilient plate and interposed between the resilient plate and the base plate;
    the reinforcing plate having a first surface and an opposing second surface, and the reinforcing plate having a recess in the first surface, the recess having a recess bottom and a recess side surface bordering the recess bottom, the recess bottom and the recess side surface being formed of the plate material of the reinforcing plate;
    the reinforcing plate having a thin part defined by the recess bottom and the second surface of the reinforcing plate;
    the recess being extended in a first direction parallel to the recess bottom to form a side opening of the recess at an edge of the reinforcing plate so that a volume of the recess is open to outside of the reinforcing elate via the first direction;
    the base plate being disposed adjacent the second surface of the reinforcing plate;
    a through opening formed in the resilient plate and aligned with the recess;
    a weld spot formed on the thin part by a laser beam welding the reinforcing plate and the base plate via the through opening formed in the resilient plate; and
    an another weld spot formed on a face of the resilient plate by a laser beam welding the resilient plate and reinforcing plate.

* * * * *